Aug. 3, 1954     I. LEVIN     2,685,449

CARRIAGE FOR HOSE OR CABLE

Filed Jan. 12, 1953

INVENTOR.
ISADORE LEVIN

BY *Joseph Rossman*

ATTORNEY

Patented Aug. 3, 1954

2,685,449

UNITED STATES PATENT OFFICE 2,685,449

CARRIAGE FOR HOSE OR CABLE

Isadore Levin, Washington, D. C.

Application January 12, 1953, Serial No. 330,858

2 Claims. (Cl. 280—47.32)

This invention relates to a mobile carriage for supporting a hose or cable for facilitating movement of same.

There are many mobile devices and installations which have connected thereto a flexible hose or cable adapted to be moved in conjunction with such mobile devices. One such device is illustrated in my Patent 2,527,270, October 24, 1950, which relates to a mobile toilet and bedpan connected to a flexible waste-conducting hose. This hose is of fairly large diameter and of substantial weight, so that when the mobile toilet unit is moved the hose drags on the floor and resists movement. Furthermore, the frictional drag on such hose may not only scratch the floor over which it is moved, but also may in time damage the hose.

The present invention overcomes this difficulty by providing a readily movable carriage which is suitably attached to the hose so that it may be readily moved over the floor while overcoming the disadvantages previously mentioned.

Figure 1:
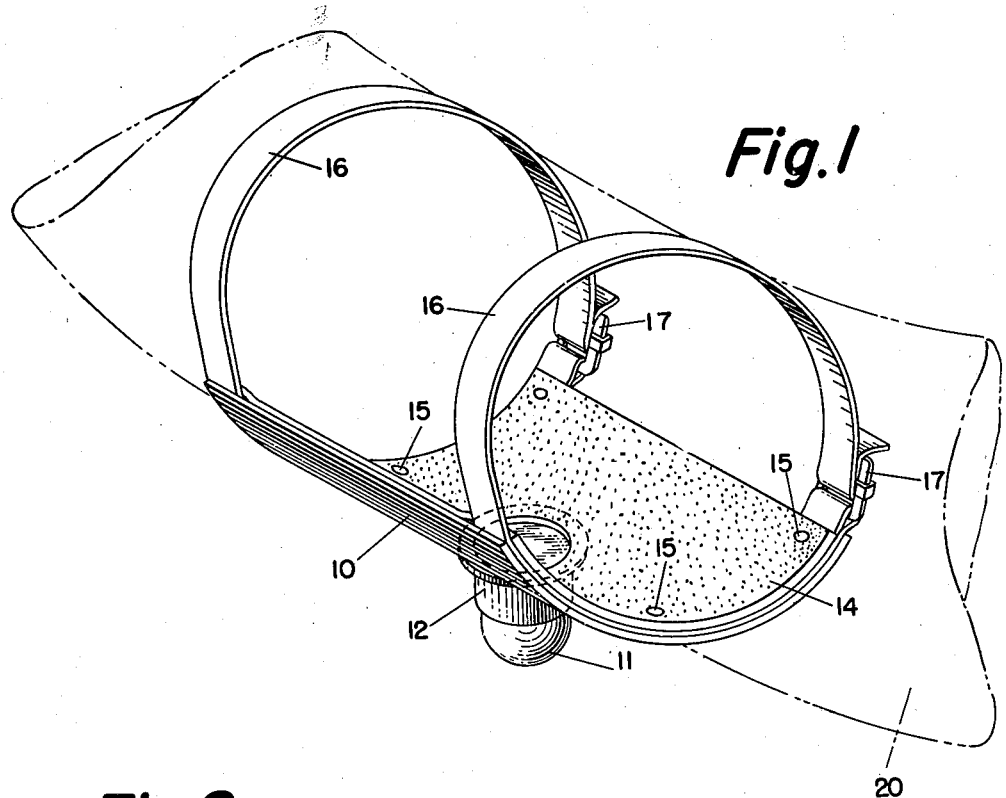
Figure 2:
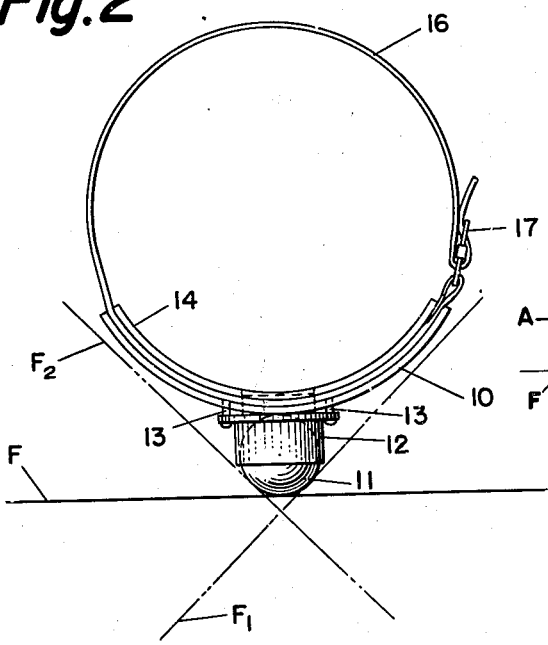
Figure 3:
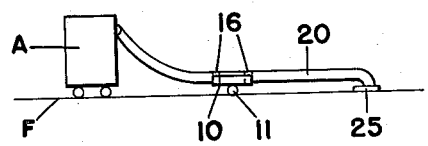

Further details and advantages of my invention will be apparent from the following specification and appended drawing, wherein Figure 1 is a perspective view of my carriage construction, Figure 2 is an end view of same, and Figure 3 is a diagrammatic view of a movable cabinet having a lengthy hose extending therefrom and a carriage for supporting the hose.

Referring to the drawing, the mobile carriage comprises a cradle 10, made of metal, plastic or other suitable material. The cradle is of suitable dimensions and curvature to support thereon a hose or cable 20. The carriage 10 may be provided with an inner lining 14 of fabric, leather or other suitable material which contacts the hose or cable supported on the cradle 10. The lining 14 may be attached to the cradle 10 by rivets 15 or by other suitable means, such as adhesive if desired.

A caster 12 is attached preferably to the bottom medial outside portion of the cradle 10 by suitable bolts 13. The caster is provided with a ball bearing 11 freely rotatable therein which is adapted to contact and roll over the floor or ground F, as shown in Figure 2. A pair of spaced flexible leather straps 16 are suitably attached to the cradle 10 which are adapted to be positioned about the hose 20 to securely fasten the carriage to the hose by looping the straps through buckles 17, as shown in Figure 1.

In use, the carriage can be removably fastened by means of straps 16 to any desired hose or cable to any suitable portion thereof, as shown in Figure 1, which will normally drag on the floor or support. As shown in Figure 3, hose 20 extends from a mobile cabinet A of the type for example as shown in Patent 2,527,270 previously referred to. The hose 20 is connected to a suitable drain connection 25 provided in floor F. The mobile carriage 10 is fastened to the hose 20 by straps 16 at the portion of the hose 20 which is likely to drag on the floor F when the cabinet A is moved in relation to drain connection 25. When such hose or cable is moved the carriage will readily move along the floor or ground on the ball bearing 11, as shown in Figure 2. In event the hose or cable inclines at an angle, as shown in Figure 2, so as to incline along the line $F_1$ on the floor or at an angle indicated by line $F_2$, the carriage will nevertheless permit easy movement of same on ball bearing 11.

My carriage construction is neat in appearance and simple in construction with no parts which can be easily damaged or get out of order. The carriage, as previously explained, facilitates easy movement of a flexible hose or cable supported thereon. The outside surface of the hose or cable is thus protected against wear and tear when moved along a supporting floor. Inasmuch as the ball caster is positioned in the medial portion of the carriage, it will serve to permit easy movement of the carriage no matter what position the carriage assumes in relation to the floor or ground. The use of a curved cradle assures snug fit of the hose or cable on the carriage. The size and curvature of the cradle can be readily selected depending upon the size and diameter of the hose or cable to be supported. The straps also serve to securely fasten the carriage to the hose or cable at any desired location thereof and can be readily disengaged or moved to another position whenever necessary.

It is to be understood that modifications and changes may be made in the specific embodiment of my invention as previously described which are intended to be included within the scope of the following claims.

I claim:

1. A mobile cabinet having a lengthy hose extending therefrom and means to support said hose comprising a curved cradle for receiving and supporting a portion of a hose or cable, a caster affixed to said cradle for permitting ready movement of said carriage over a floor and means on said cradle for removably attaching the carriage to said hose or cable.

2. A mobile carriage for supporting a portion of a hose or cable thereon as defined in claim 1, wherein the cradle is provided with an inner lining contacting the hose or cable.

References Cited in the file of this patent

UNITED STATES PATENTS

| Number | Name | Date |
|---|---|---|
| 664,240 | Doehring | Dec. 18, 1900 |
| 2,318,059 | Cooper | May 4, 1943 |
| 2,423,292 | Brown | July 1, 1947 |
| 2,440,527 | Talley | Apr. 27, 1948 |

FOREIGN PATENTS

| Number | Country | Date |
|---|---|---|
| 238,248 | Switzerland | Oct. 16, 1945 |